United States Patent
Choi et al.

[19]

[11] Patent Number: 6,155,802
[45] Date of Patent: Dec. 5, 2000

[54] TURBO COMPRESSOR

[75] Inventors: Moon-Chang Choi; Hyeong-Seok Kim; Sang-Wook Lee, all of Kyungki-Do, Rep. of Korea

[73] Assignee: LG Electronics, Inc., Rep. of Korea

[21] Appl. No.: 09/195,266

[22] Filed: Nov. 18, 1998

[30] Foreign Application Priority Data

Nov. 29, 1997 [KR] Rep. of Korea ............ 97-64568

[51] Int. Cl.⁷ .............. F04B 17/00; F01D 1/02
[52] U.S. Cl. .............. 417/366; 417/350; 417/371; 417/423.5; 415/199.1
[58] Field of Search .............. 417/350, 366, 417/371, 423.5; 415/199.1, 199.2, 199.3

[56] References Cited

U.S. PATENT DOCUMENTS

| | | | |
|---|---|---|---|
| 4,105,372 | 8/1978 | Mishina | 417/350 |
| 4,116,583 | 9/1978 | Budris | 415/199.1 |
| 5,591,017 | 1/1997 | Dwyer | 417/366 |
| 5,857,348 | 1/1999 | Conry | 417/423.12 |
| 6,009,722 | 1/2000 | Choi et al. | 62/505 |

FOREIGN PATENT DOCUMENTS 9764567  11/1997  Rep. of Korea.

*Primary Examiner*—Timothy S. Thorpe
*Assistant Examiner*—Michael K. Gray
*Attorney, Agent, or Firm*—Ostrolenk, Faber, Gerb & Soffen, LLP

[57] ABSTRACT

A turbo compressor is disclosed. The compressor includes a hermetically sealed shell, a motor chamber formed at a center portion of the shell, a driving motor installed in the motor chamber, a driving shaft engaged with the driving motor having its one end inserted into a first compression chamber and its other end inserted into a second compression chamber with said first and second compression chambers being formed at both sides of the shell, first and second impellers disposed in the first and second compression chambers in a face-to-face form and rotatably engaged with both ends of the driving shaft, and a gas flow path through which a refrigerant gas is sucked for thereby first compressing the gas in the first compression chamber and discharging to the second compression chamber for thereby implementing a small size compressor, decreasing the number of parts and increasing a compression efficiency.

28 Claims, 3 Drawing Sheets

TURBO COMPRESSOR

BACKGROUND OF THE INVENTION

1. Field of the Invention

The present invention relates to a turbo compressor, and in particular to an improved turbo compressor which is capable of minimizing the size of a compressor, enhancing a compression efficiency, and minimizing the leakage of a refrigerant gas by providing an improved refrigerant gas flow path capable of decreasing a pressure difference between a compression chamber and a motor chamber.

2. Description of the Conventional Art

Generally, the compressor is an apparatus for compressing a gas such as air, a refrigerant gas etc. by a rotation operation of an impeller or a rotor and a reciprocating operation of a piston.

The above-described compressor is formed of a driving force generation unit for driving an impeller, a rotor, and a piston and a compression mechanism for sucking and compressing gas by a driving force transferred from the driving force generation unit.

The above-described compressor is classified into a hermetically sealed type compressor and a separation type compressor in accordance with an installed position of the driving force generation unit and the compression mechanism. The hermetically sealed type compressor is formed of a hermetically sealed container in which the driving force generation unit and the compression mechanism unit are installed. In the separation type compressor, the driving force generation unit is installed outside the hermetically sealed container for thereby transferring the driving force generated by the driving force generation unit to the compressor mechanism unit installed in the hermetically sealed container.

In addition, the conventional hermetically sealed compressor is classified into a rotation type compressor (so-called, a rotary compressor), a reciprocating type compressor, a scroll type compressor, etc. in accordance with the structure for compressing gas. A container type mechanism is formed in each of the above-described compressors for compressing gas by decreasing the volume of the same.

Among the above-described container type compressors, in the rotation type compressor, an eccentric shaft is installed in a cylinder having a cylindrical space therein and is rotated for thereby decreasing the volume of the space therein, so that the gas in the space is compressed. In the reciprocating type compressor, a piston reciprocates within the cylinder for thereby decreasing the volume of the inner space of the cylinder, so that the gas in the space is compressed. In the scroll compressor, upper and lower scrolls each having an involute curve type wrap are engaged with each other and are rotated for thereby pressurizing the gas therein by decreasing the volume of the inner space of the compressor.

However, the conventional rotational type compressor and reciprocating type compressor are not expensive but generate much vibration noise when pressurizing the gas, and the compression efficiency is low.

In addition, the scroll compressor has small vibration noise and high compression efficiency when continuously pressurizing the gas, the number of parts is large for thereby increasing the fabrication cost.

Furthermore, the conventional scroll compressor uses a high pressure refrigerant gas, the size of the same is bulky, and the same is heavy. When adapting this kind of the compressor to a home appliance, the size of the home appliance is increased, and the same is heavy, so that it is very difficult to handle the same.

In order to overcome the above-described problems, a turbo compressor is introduced, which is basically directed to generating a pressure difference using a centrifugal force. In the turbo compressor, an impeller is rotated using a driving force of a motor, and a gas such as air and refrigerant gas is sucked and then compressed using the centrifugal force generated when the impeller is rotated.

FIG. 1 is a cross-sectional view illustrating the construction of a two-stage compression type turbo compressor filed in Korea Industrial Property Office and having Ser. No. 97-64567. As shown therein, in the conventional turbo compressor, a first compression chamber 111 communicating with an accumulator A and a second compression chamber 112 communicating with a condenser (not shown) are installed at both sides in the interior of a hermetically sealed container 110.

A motor chamber 113 in which a brushless DC motor 120 is installed is formed at the inner center portion of the sealed container 110.

The interiors of the first and second compression chambers 111 and 112 and the motor chamber 113 communicate with a gas flow path 114 formed on an outer circumferential surface of the motor chamber 113.

In addition, both ends of a driving shaft 130 engaged with the motor 120 are positioned in the first and second compression chambers 111 and 112, and first and second impellers 140 and 150 are engaged to both ends of the driving shaft 130 for compressing the gas sucked by the rotation of the same.

A radial bearing 160 is disposed at both sides of the motor 120 for radially supporting the driving shaft 130, and a thrust bearing 170 is disposed to an outer circumferential surface of the driving shaft 130 for axially supporting the driving shaft 130 at both sides of the radial bearing 160.

In the first and second compression chambers, there are provided first and second impellers 140 and 150 for increasing the kinetic energy by accelerating the suction refrigerant gas, and first and second diffusers 111a and 112a and first and second volute portions 111b and 112b are formed therein for converting the kinetic energy into a constant pressure.

At this time, the first and second impellers 140 and 150 installed in the conventional turbo compressor are formed to have an outer diameter smaller than the inner diameter through which the gas is discharged. Namely, the first and second impellers 140 and 150 are formed in a conical shape (back to back shape).

In addition, an inlet through hole 113a for guiding a part of gas from the gas flow path 113 into the interior of the motor chamber 113 through the first compression chamber 111 for cooling the motor and an outlet through hole 113b for guiding the flow of gas flown into the motor chamber 113 through the inlet through hole 113a and cooled the motor chamber 113 to the second compression chamber 112 through the gas flow path 114.

In the drawings, reference numeral 110a represents a refrigerant gas suction port, and 110b represents a refrigerant gas discharge port.

The operation of the conventional turbo compressor will be explained.

When an electric power is supplied to the motor 120, a magnetic force is induced. The driving shaft 130 is rotated at a high speed by the thusly generated force, so that the first and second impellers 140 and 150 fixed to both ends of the driving shaft 130 are rotated.

Continuously, the refrigerant gas is sucked into the compression chambers 111 and 112 by the rotation of the impellers 140 and 150 and is sprayed in a screw shape by the centrifugal force of the impellers 140 and 150 and is introduced into the volute portions 111b and 112b through the diffusers 111a and 112a. During this process, the refrigerant gas is compressed by an increase of the pressure head and then is discharged to the condenser (not shown) through the discharge port 110b.

The refrigerant gas is sucked from the accumulator A into the first compression chamber 111 by the rotation of the first impeller 140 and is accelerated by the first impeller 140.

The thusly accelerated refrigerant gas passes through the first diffuser 111a and is flown into the first volute portion 111b for thereby implementing a first compression, and the thusly first compressed gas is sucked into the second compression chamber 112 through the gas flow path 114.

Continuously, the first compressed gas sucked into the second compression chamber 112 is accelerated by the second impeller 150, and the thusly accelerated first compressed gas passes through the second diffuser and is flown into the second volute portion 112b for thereby implementing a second compression thereby and then is discharged to the discharge port 110b.

At this time, a seal (Labyrinth seal) 141 is formed at the inner portions of the first impeller 140 and the second impeller 150 for thereby preventing the refrigerant gas from being leaked into the motor chamber.

In the conventional turbo compressor, a part of the first compressed refrigerant gas flowing through the gas flow path 114 flows into the interior of the motor chamber 113 through the inlet through hole 113a formed on the wall surface of the motor chamber 113, and the thusly introduced gas cools the elements in the motor chamber 113, in which the motor 120 is installed, and flows to the gas flow path 114 through the outlet through hole 113b and is sucked into the second compression chamber 112. Since the driving shaft 130 rotates in a load-free state, the driving shaft 130 may be radially and axially moved. However, the above-described radial and axial movements are prevented by the bearing 170.

In the thusly constituted turbo compressor, since the inlet and outlet through holes communicating with the gas flow path are formed between the first and second compression chambers, and then the first compressed high temperature compression gas cools the motor, the cooling efficiency of the motor may be decreased.

In addition, since the accumulator is additionally installed for fully generating a refrigerant gas introduced into the first compression chamber, the construction of the system is complicated.

Since the first and second impellers are installed in a conical shape (back to back shape), when the compressed refrigerant gas is discharged, a seal is needed for preventing the compressed refrigerant gas from being leaked from the motor chamber.

SUMMARY OF THE INVENTION

Accordingly, it is an object of the present invention to provide a turbo compressor which overcomes the aforementioned problems encountered in the conventional art.

It is another object of the present invention to provide a turbo compressor which is capable of enhancing a performance of the compressor by minimizing the leakage of a compressed refrigerant gas.

It is another object of the present invention to provide a turbo compressor in which the refrigerant gas flown from an evaporator directly cools the motor and is fully vaporized for thereby enhancing a cooling efficiency, and an accumulator and other apparatuses for cooling the motor are not needed in the present invention.

It is another object of the present invention to provide a turbo compressor which is capable of implementing a small size compressor, decreasing the number of parts and increasing a compression efficiency.

To achieve the above objects, there is provided a turbo compressor according to a first embodiment of the present invention which includes a hermetically sealed container having a second compression chamber having a first compression chamber and a discharge port formed at both sides of the same, a motor chamber formed in an inner center portion, a refrigerant gas suction port formed below the motor chamber and communicating with an evaporator and the motor chamber, a first gas flow path communicating with the interior of the motor chamber and the first compression chamber and a second gas flow path communicating with the first compression chamber and the second compression chamber; a driving motor disposed in the motor chamber; a driving shaft engaged with the driving motor and having its one end inserted into the first compression chamber and the other end inserted into the second compression chamber; a first impeller disposed in the first compression chamber, rotatably engaged with one end of the driving shaft, first compressing the gas introduced through the first gas flow path, discharging the gas to the second compression chamber through the second gas flow path, and having an inner diameter, through which the gas is introduced, smaller than an outer diameter of the same through which the gas is discharged; and a second impeller disposed in the second compression chamber, rotatably engaged with the other end of the driving shaft, second compressing the first compressed gas introduced into the second compression chamber and discharging the gas to a discharge port.

To achieve the above objects, there is provided a turbo compressor according to a second embodiment of the present invention which includes a hermetically sealed shell; a motor chamber formed at a center portion of the shell; a driving motor installed in the motor chamber; a driving shaft engaged with the driving motor having its one end inserted into a first compression chamber and its other end inserted into a second compression chamber with said first and second compression chambers being formed at both sides of the shell; first and second impellers disposed in the first and second compression chambers in a face-to-face form and rotatably engaged with both ends of the driving shaft; and a gas flow path through which a refrigerant gas is sucked for thereby first compressing the gas in the first compression chamber and discharging to the second compression chamber.

The first and second impellers are formed in a face-to-face shape.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

The embodiments of the present invention will be explained with reference to the accompanying drawings.

Figure 1:
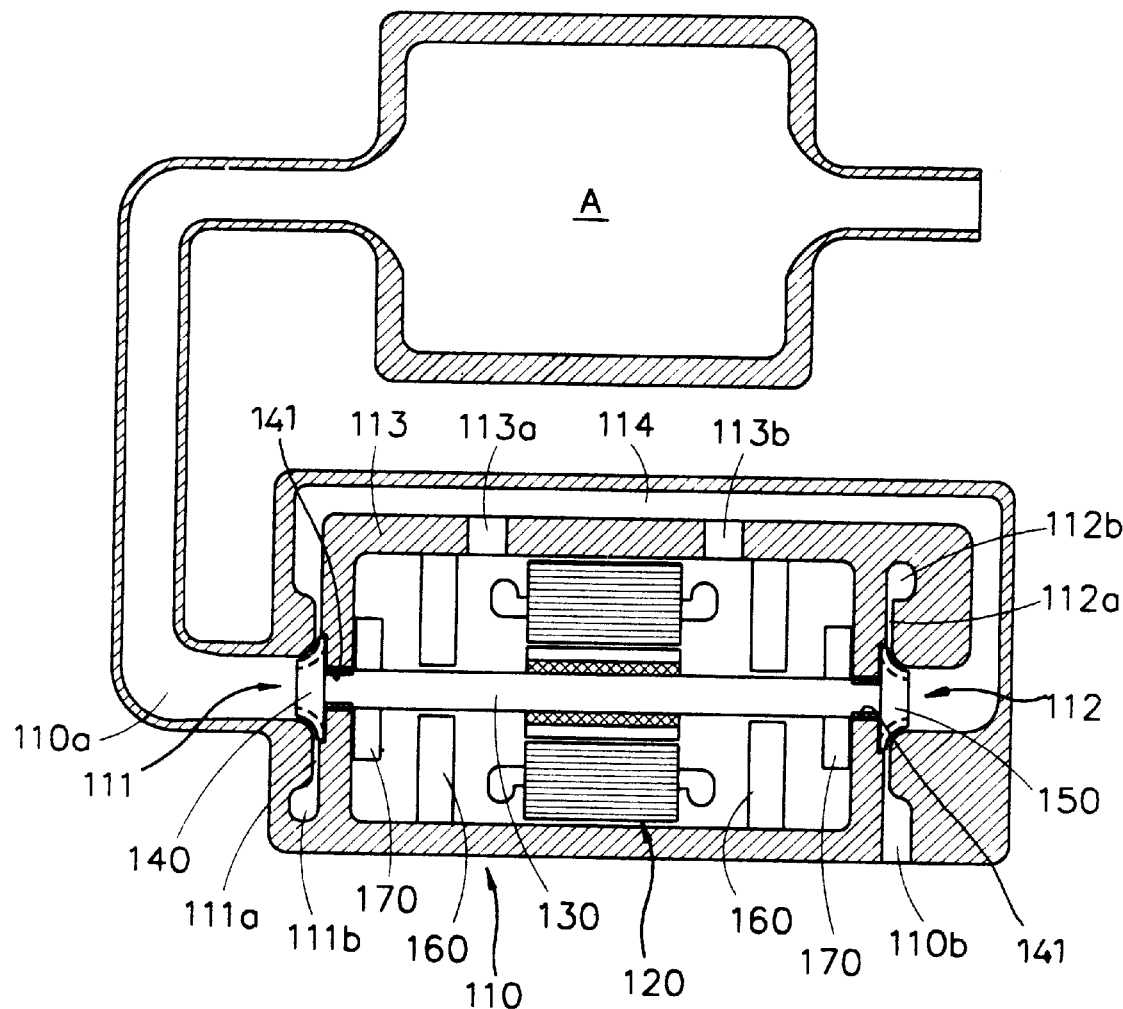
FIG. 1 is a cross-sectional view illustrating a conventional turbo compressor.
Figure 2:
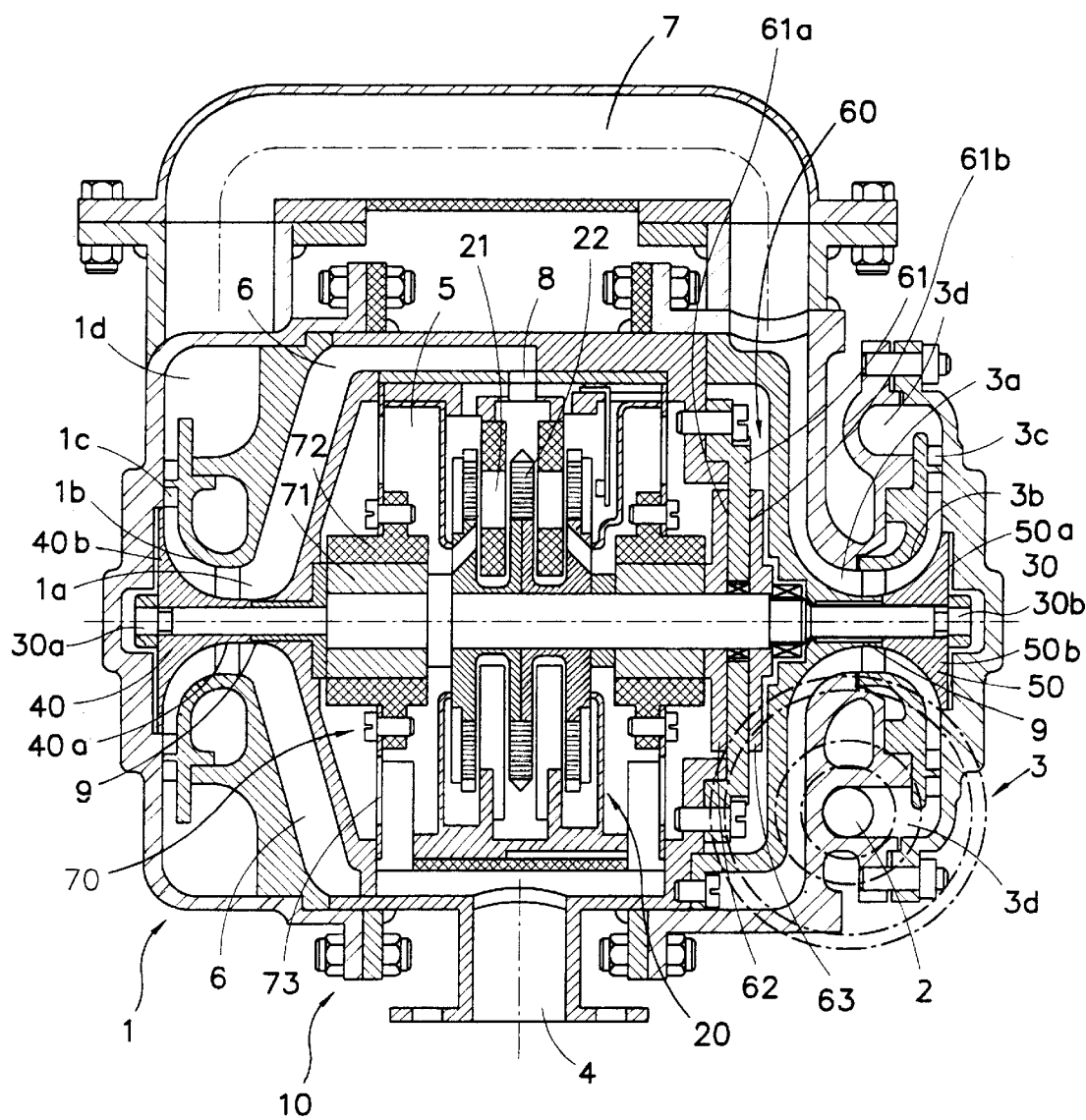
FIG. 2 is a cross-sectional view illustrating a turbo compressor according to the present invention.

In the turbo compressor of the present invention, as shown in FIG. 2, a motor chamber 5 having an inner space in which a driving motor 20 is installed in the interior of the sealed container 10 is formed.

A refrigerant gas suction port 4 is formed below the motor chamber 5. A refrigerant gas outlet hole 8 is formed above the motor chamber 5. At this time, the refrigerant gas suction port 4 is connected with an evaporator (not shown) forming a freezing/air conditioning cycle, and a refrigerant gas discharge port 2 is connected with a condenser (not shown).

A first compression chamber 1 and a second compression chamber 3 having a refrigerant gas discharge port 2 are formed at both sides of the hermetically sealed container 10.

In addition, a first gas flow path 6 is formed at one side of the motor chamber 5 and communicates the motor chamber 5 with the first compression chamber 1, and a second gas flow path 7 is formed above the motor chamber 5 and communicates the first compression chamber 1 and the second compression chamber 3, and a refrigerant gas discharge port 2 is formed at another side of the second compression chamber 3.

A driving shaft 30 is engaged with the driving motor 20 for transferring the driving force of the driving motor 20. One end 30a of the driving shaft 30 is inserted into the first compression chamber 1, and the other end 30b of the same is inserted into the second compression chamber 3.

A first impeller 40, having an inner small diameter portion 40a and an outer large diameter portion 40b, is rotatably engaged with one end 30a of the driving shaft 30 in the first compression chamber 1 for thereby first compressing the refrigerant gas introduced through the refrigerant gas suction port 4 and the first gas flow path 6 after cooling the motor chamber 5 and discharges the first-compressed refrigerant gas into the second compression chamber 3 through the second gas flow path 7.

A second impeller 50, having an inner diameter portion 50a and an outer large diameter portion 50b, is rotatably engaged with the other 30b end of the driving shaft 30 in the second compression chamber 3 for thereby second compressing the gas which is first compressed and introduced into the second compression chamber 3 and discharging the same to the refrigerant gas discharge port 2.

The structure of the turbo compressor according to the present invention will be explained in detail with reference to the first and second compression chambers 1 and 2.

Figure 3A:
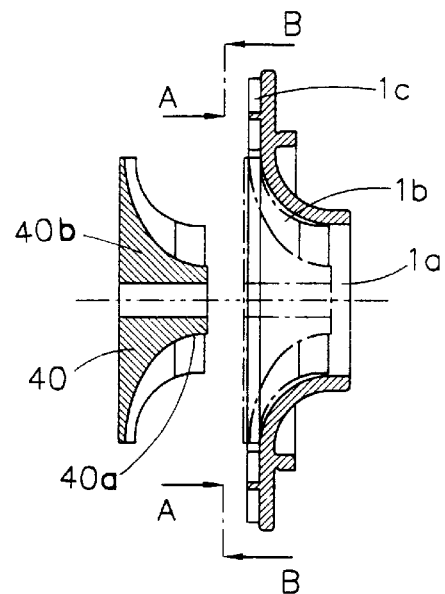
FIG. 3A is an exploded cross-sectional view illustrating a compression chamber of a turbo compressor according to the present invention.
Figure 3B:
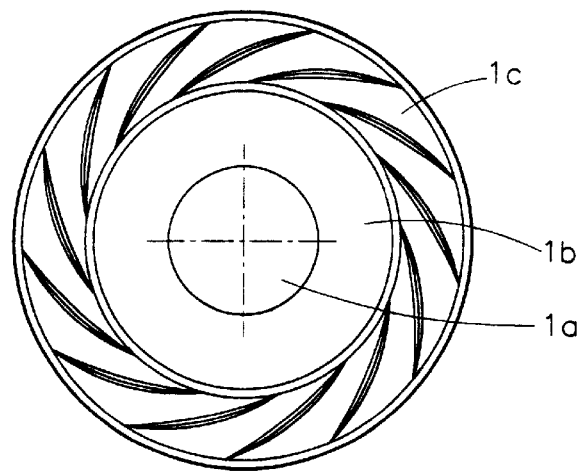
FIG. 3B is a side view taken along the line A—A of FIG. 3A.
Figure 3C:
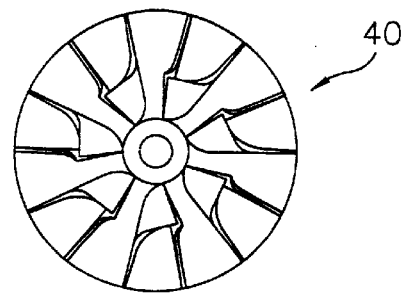
FIG. 3C is a side view taken along the line B—B of FIG. 3A.

As shown in FIGS. 2 through 3C, the first compression chamber 1 includes an inducer 1a communicating with the first gas flow path 6 for inducing the suction gas, a first impeller chamber 1b, in which the first impeller 40 is inserted, communicating with the inducer 1a, for increasing the kinetic energy of the gas, and a vane diffuser 1c and a volute portion 2d communicating the first compression chamber and impeller chamber 1b with the second gas flow path 7 and converting the kinetic energy of the gas to a constant pressure and inducing the gas to the second gas flow path 7.

In more detail, as shown in FIG. 3A, the first impeller chamber 1b is formed in a conical shape to have a predetermined volume in which an inlet through which the gas is introduced, the diameter of which is smaller than that of the outlet through which the gas is discharged. The first impeller 40 rotating in the first impeller chamber 1b is formed in a conical shape, in which the diameter of the outlet is larger than that of the inlet, to correspond with the shape of the first impeller chamber 1b. The portion of the smaller diameter of the first impeller 40 is engaged with the driving shaft 30.

One end of the vane diffuser 1c communicates with a larger diameter portion of the first impeller chamber 1b, and the width of the same is formed to be smaller than the diameter of the first gas flow path 6 and the width of the first impeller chamber 1b.

The volute portion 1d is formed in a circular shape to communicate with the other end of the vane diffuser 1c, and the diameter of the same is formed to be gradually increased in the direction that the gas is discharged.

The second compression chamber 3 includes an inducer 3a communicating with the second gas flow path 7 and inducing the first compressed gas, a second impeller chamber 3b, into which the second impeller 50 is inserted, communicating with the inducer 3a for increasing the kinetic energy of the gas, and a vane diffuser 3c communicating the second impeller chamber 3b with the refrigerant gas discharge port 2 for converting the kinetic energy of the gas to a predetermined gas state and discharging the gas to the refrigerant gas discharge port 2.

The second impeller chamber 3b has an inlet, through which the gas is introduced, the diameter of which is smaller than the that of the outlet through which the gas is discharged, and the second impeller 50 rotating in the second impeller 3b is formed to have a conical shape in which the diameter of the inlet is smaller than that of the outlet to correspond with the shape of the second impeller chamber 3b, and the portion having a smaller diameter is engaged with the end portion of the driving shaft 30.

One end of the vane diffuser 3c communicated with a larger diameter edge portion of the second impeller chamber 3b, and the width of the same is smaller than the width of the second impeller chamber 3b.

The volute portion 3d is formed in a circular shape and communicate with the other end of the vane diffuser 3c, and the diameter of the same is gradually increased in the direction that the gas is discharged, and the end portion of the same communicates with the refrigerant gas discharge port 2.

The motor chamber 5 is formed in a cylindrical shape having a predetermined diameter and length, and a shaft insertion hole 9 into which both ends of the driving shaft 30 are inserted is formed at both side surfaces of the motor chamber 5, and the shaft insertion hole 9 communicates with the first impeller chamber 1b and the second impeller chamber 3b, respectively.

The driving motor 20 is formed of an axial type brushless DC motor in which a stator 21 and a rotor 22 are formed in a circular plate shape.

In detail, the driving motor 20 includes a rotator formed of a plurality of circular plates fixed to the driving shaft 30 in a multiple tire structure, and a stator 21 formed of a plurality of circular plates fixed to the motor chamber 5 in an alternate engagement with the circular plates of the rotor 22.

An axial direction support unit 60 is engaged with one end of the driving shaft 30 for axially supporting the driving shaft 30.

The axial direction support unit 60 includes a fixing plate 61 fixed to the inner side of the hermetically sealed container 10 for supporting the weight, and an inner side support plate 62 and an outer side support plate 63 engaged with the driving shaft 30 in a slidable contact with both side surfaces 61a, 61b of the fixing plate 61.

The axial direction support unit 60 according to the present invention is positioned in the side of the second compression chamber 3 and is engaged with the driving shaft 3.

Spaced-apart support units 70 are engaged with the driving shaft 30 for radially supporting the driving shaft 30.

The radial direction support unit 70 includes a bush bearing 71 contacting with the outer circumferential surface of the driving shaft 30 and inserted in the other circumferential of the driving shaft 30, a bearing housing 72 having an inner diameter having a predetermined difference with respect to an outer diameter of the bush bearing 71, and a support member 73 fixed to the inner side of the hermetically sealed container 10 and supporting the bearing housing 72.

At this time, the outer circumferential surface of the bush bearing 71 and the inner circumferential surface of the bearing housing 72 are fine-processed, and a predetermined difference between the outer circumferential surface of the bush bearing 71 and the outer circumferential surface of the bearing housing 72 into which the bush bearing 71 is inserted is formed so that a gas bearing is formed by the refrigerant gas when the driving shaft 30 is rotated at a high speed.

In addition, the support member 73 supporting the bearing housing 72 is formed of a predetermined flexible material for absorbing vibrations occurring when the driving shaft 30 inserted into the bush bearing 71 is rotated.

In the present invention, the radial direction support units 70 are supported by both sides of the driving motor 20.

The operation and effects of the turbo compressor according to the present invention will be explained.

In the turbo compressor according to the present invention, when a current is applied to the driving motor 20, the driving motor 20 is driven, and then the driving force of the driving motor 20 is transferred to the driving shaft 30 for thereby rotating the driving shaft 30.

Continuously, the first impeller 40 and the second impeller 50 engaged with both ends of the driving shaft 30 are rotated by the rotation of the driving shaft 30.

At this time, heat is generated when the driving motor 20 is driven. Therefore, the interior of the motor chamber 5 becomes a high temperature state. In this state, a lower temperature and low pressure refrigerant gas from the evaporator is directly flown into the motor chamber 5 through the refrigerant gas suction port 4 by the rotation force of the first impeller 40 and the second impeller 50 and then cools the driving motor 20 for thereby fully cooling the motor chamber 5.

In the structure according to the present invention, the lower temperature and lower pressure refrigerant gas from the evaporator is flown into the motor chamber 5 for thereby cooling the driving motor 20, so that the cooling efficiency is excellent, and an additional cooling apparatus is not needed because the sucked refrigerant gas from the evaporator directly cools the motor.

After the driving motor 20 is cooled in the above-described manner, the refrigerant gas is flown into the first gas flow path 6 through the refrigerant gas outlet hole 8 formed on the upper portion of the motor chamber 5.

The refrigerant gas flown into the first gas flow path 6 is flown into the first compression chamber 1 for thereby first compressing the gas therein, and the thusly compressed gas is flown into the second compression chamber 3 through the second gas flow path 7, and the first compressed refrigerant gas flown into the second compression chamber 3 is compressed again in the second compression chamber 3 and then the high pressure refrigerant gas is discharged through the refrigerant gas discharge port 2.

The thusly discharged high pressure refrigerant gas is flown into the condenser.

The step for first compressing the refrigerant gas in the second compression chamber 2 will be explained in more detail. The refrigerant gas flown into the first gas flow path 6 is flown into the first impeller chamber 1b through the inducer 1a, and the energy of the refrigerant gas flown into the first impeller chamber 1b is increased by the rotation force of the first impeller 40 and a constant pressure is also slightly increased. When the refrigerant gas passes through the vane diffuser 1c and the volute portion 1d, the kinetic energy of the refrigerant gas is changed to a constant pressure, so that the pressure is increased.

In addition, the step for second compressing the refrigerant gas first compressed in the second compression chamber 3 is the same as the step for compressing the refrigerant gas in the first compression chamber. The refrigerant gas passed through the fist and second compression steps becomes a high pressure state.

Namely, the degree that the refrigerant gas is compressed in the first and second compression chambers 1 and 3 is in proportion to the kinetic energy generated by the rotation of the first and second impellers 40 and 50. The thusly generated kinetic energy is in proportion to the linear speed at the edge portions of the first and second impellers 40 and 50 when the first and second impellers 40 and 50 are rotated.

Therefore, in order to maintain a uniform compression state of the refrigerant gas, if the diameters of the first and second impellers 40 and 50 are small, the first and second impellers 40 and 50 should be rotated at a high speed compared to the other impellers having the relatively larger diameters.

Since the first and second impellers 1b and 3b of the first and second compression chambers 1 and 3 are formed in a face-to-face shape, the rear side surfaces of the first and second impellers 1b and 3b are sealed by the hermetically sealed container 10, and the pressure of the first inducer 1a of the first compression chamber 1 into which the gas is flown is similar with the pressure of the motor chamber 5. Even when a pressure difference exists between the second inducer 3a of the second compression chamber 3 and the motor chamber 5, since the same are sealed by the axial direction support unit 60, it is possible to minimize the leakage of the compressed refrigerant gas without using the Labyrinth seal.

Therefore, in the turbo compressor according to the present invention, the lower temperature and lower pressure refrigerant gas from the evaporator directly cools the motor, and since the refrigerant gas is flown into the interior of the compressor in a full gas state by the vaporizing latent heat. Therefore, the accumulator for introducing the refrigerant gas in a full gas state is not needed in the present invention.

In addition, the driving shaft 30 having it both ends engaged with the first and second impellers 40 and 50 rotating and compressing the refrigerant gas in the first and second compression chambers 1 and 3 receives a load in a one side axial direction or in a two-side axial direction due to the pressure difference between the first compression chamber 1 and the second compression chamber 3. Since this load is supported by the axial support unit 60 engaged with the end portion of the driving shaft 30, the driving shaft 30 is stably rotated.

Namely, the surfaces of the fixing plate 61 of the axial direction support unit 60 are formed of a bearing surface and contact with the inner side support plate 62 and the outer support plate 63 engaged with the driving shaft 30, so that the driving shaft 30 is stably rotated without movement in the axial direction.

The driving shaft 30 is radially supported by the radial direction support unit 70 engaged with the driving shaft 30, so that the driving shaft 30 is stably rotated without movements in the radial direction.

The bush bearing 71 and the bearing housing 72 of the radial direction support unit 70 forms a gas bearing for implementing a high speed rotation of the driving shaft 30, and the vibration which may occur during the high speed rotation of the driving shaft is effectively absorbed by the support member 73 for thereby stably supporting the driving shaft 30.

As the driving motor 20 for driving the driving shaft 30, a radial type brushless motor capable of generating a high speed rotation is used.

The radial type brushless motor used in the present invention is formed of coils wound onto the stator 21 formed of a resin, and a plurality of magnets attached to the cylindrical rotor. The stators 21 and the rotors 22 are alternately disposed.

Therefore, since the radial type brushless motor does not have an accumulating core, there is no iron loss, thereby attaining a high efficiency. In addition, the output of the driving motor 20 may be easily increased by increasing the number of the circular plates of the stator 21 and the rotor 22.

Since the stators 21 and the rotors 22 are formed of alternately engaged plates, it is easy to form a cooling oil flow path for cooling the motor.

As described above, in the turbo compressor according to the present invention, since the refrigerant gas sucked into the interior of the compressor directly cools the motor and is fully vaporized, the accumulator and an additional apparatus for cooling the motor are not needed, thereby decreasing the number of elements and the fabrication cost.

In addition, two opposite impellers are formed in a face-to-face shape, and the refrigerant flow path is formed so that a pressure difference at both ends of each of the impellers is minimized thereby minimizing the leakage of the compressed refrigerant gas and enhancing the performance of the compressor.

The first and second impellers are designed to have a small diameter and to rotate at a high speed, so that the refrigerant gas is compressed to a high pressure using impellers having smaller diameters, and the thusly compressed refrigerant gas is discharged.

In the conventional hermetically sealed compressor, the high pressure refrigerant gas is used based on a volume-based type. However, in the present invention, the amount of the flow of the gas is large for thereby using a low pressure refrigerant gas, so that the interior of the hermetically sealed container 10 maintains a low pressure state in the entire portions of the system. Therefore, plastic material may be used for the heat exchanger and other piping portions thereby decreasing the weight of the compressor.

In the present invention, since the number of the elements used for compressing the refrigerant gas is small, the number of elements of the compressor is significantly decreased.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. A turbo compressor comprising:

a hermetically sealed container having a first compression chamber and a second compression chamber and having a discharge port fluidly connected to the second compression chamber, a motor chamber, a refrigerant gas suction port formed below the motor chamber and communicating with an evaporator and the motor chamber, a first gas flow path communicating with the motor chamber and the first compression chamber and a second gas flow path communicating with the first compression chamber and the second compression chamber;

a driving motor disposed in the motor chamber;

a driving shaft engaged with the driving motor and having one end inserted into the first compression chamber and a second end inserted into the second compression chamber;

a first impeller disposed in the first compression chamber, rotatably engaged with the one end of the driving shaft, first compressing the suction gas introduced through the first gas flow path, discharging first compressed gas to the second compression chamber through the second gas flow path, and having a diameter in an inner diameter portion, where gas is introduced, smaller than a diameter in an outer diameter portion where the first compressed gas is discharged; and a second impeller disposed in the second compression chamber, rotatably engaged with the second end of the driving shaft, compressing for a second time the first compressed gas introduced into the second compression chamber and discharging twice compressed gas to the discharge port; and wherein the inner diameter portion of the first impeller faces an inner diameter portion of the second impeller.

2. The compressor of claim 1, wherein the suction gas passed through the evaporator is directly introduced into the motor chamber through the refrigerant gas suction port for thereby cooling the motor chamber and is fully vaporized and then is flown into the first gas flow path.

3. The compressor of claim 1, wherein said first compression chamber includes:

an inducer communicating with the first gas flow path and inducing the suction gas;

a first impeller chamber, in which the first impeller is disposed, communicating with the inducer and increasing a kinetic energy of the gas sucked; and a vane diffuser and volute portion communicating the first impeller chamber with the second gas flow path, converting the kinetic energy of the first compressed gas to a constant pressure, and inducing the first compressed gas to the second gas flow path.

4. The compressor of claim 1, wherein said second compression chamber includes:

an inducer communicating with the second gas flow path and inducing the first compressed gas;

a second impeller chamber, in which the second impeller is disposed communicating with the inducer and increasing the kinetic energy of the first compressed gas; and a vane diffuser and volute portion communicating the second impeller chamber with the discharge port, converting the kinetic energy of the twice compressed gas to a constant pressure and discharging the twice compressed gas to the discharge port.

5. The compressor of claim 4, wherein said second impeller chamber has an inlet through which gas is introduced, the diameter of which is smaller than that of an outlet through which the gas is discharged, and said second impeller rotating in the second impeller chamber has a diameter in an inner diameter portion, where the first gas is introduced, smaller than a diameter in an outer diameter portion where the second compressed gas is discharged.

6. The compressor of claim 1 wherein the small diameter portion of the second impeller is engaged with the one end of the driving shaft.

7. The compressor of claim 1, wherein a small diameter portion of the second impeller is engaged with the second end of the driving shaft.

8. The compressor of claim 1, wherein an axial direction support means supporting axially the driving shaft is engaged with the driving shaft.

9. The compressor of claim 8, wherein said axial direction support means includes:

a fixing plate fixed to an interior portion of the hermetically sealed container for supporting the weight of the same; and an inner side support plate and an outer side support plate engaged with the driving shaft, respectively.

10. The compressor of claim 8, wherein said axial direction support means is disposed toward the second compression chamber and is engaged with the driving shaft.

11. The compressor of claim 1, wherein a plurality of radial direction support means are disposed at the driving shaft at a predetermined interval for radially supporting the driving shaft.

12. The compressor of claim 11, wherein said radial direction support means includes:

a bush bearing contacting with an outer circumferential surface of the driving shaft and inserted on an outer circumferential of the driving shaft;

a bearing housing having an inner diameter having a predetermined difference with an outer diameter of the bush bearing; and a support member fixed to an inner side of the hermetically sealed container and supporting the bearing housing.

13. The compressor of claim 12, wherein said support member supporting the bearing housing is formed of a flexible material capable of absorbing vibration occurring when a driving shaft inserted into the bush bearing is rotated.

14. The compressor of claim 11, wherein said radial direction support means is disposed at both sides of the driving motor.

15. The compressor of claim 1, wherein the pressure of the first compression chamber into which the suction gas is introduced is similar with the pressure of the motor chamber, and a portion between the second compression chamber and the motor chamber is hermetically sealed by an axial direction support means.

16. The compressor of claim 1, wherein said driving motor has a plurality of circular plate shape stators and rotators which are alternately engaged to the driving motor.

17. A turbo compressor, comprising:

a hermetically sealed shell;

a motor chamber formed in the shell;

a driving shaft engaged with the driving motor having one end inserted into a first compression chamber and a second end into a second compression chamber;

said first and second compression chambers being formed at opposite sides of the shell;

first and second impellers disposed in the first and second compression chamber, respectively, in a face-to-face form such that a small diameter portion of the first impeller faces a small diameter portion of the second impeller, the respective small diameter portions of the first and second impellers being rotatably engaged with both ends of the driving shaft; and a gas flow path through which a refrigerant gas is sucked to the first compression chamber; and wherein the refrigerant gas is compressed in the first compression chamber such that a first compressed gas is discharged to the second compression chamber via a second gas flow path.

18. The compressor of claim 17, wherein said driving motor has a plurality of circular plate shape stators and rotators which are alternately engaged to the driving motor.

19. The compressor of claim 17, wherein the refrigerant gas is flown into the first compression chamber through the motor chamber.

20. The compressor of claim 17, wherein said first compression chamber includes:

an inducer communicating with the first gas flow path and inducing the refrigerant gas;

a first impeller chamber, in which the first impeller is disposed, communicating with the inducer and increasing a kinetic energy of the refrigerant gas sucked; and a vane diffuser and volute portion communicating the first impeller chamber with the second gas flow path, converting the kinetic energy of the first compressed gas to a constant pressure, and inducing the first compressed gas to the second flow path.

21. The compressor of claim 17, wherein said second compression chamber includes:

an inducer communicating with the second gas flow path and inducing the first compressed gas;

a second impeller chamber, in which the second impeller is disposed, communicating with the inducer and increasing the kinetic energy of the first compressed gas sucked; and a vane diffuser and volute portion communicating the second impeller chamber with a discharge port, and converting the kinetic energy of a twice compressed gas to a constant pressure and discharging the twice compressed gas to the discharge port.

22. The compressor of claim 17, wherein an axial direction support means supporting axially the driving shaft is engaged with the driving shaft.

23. The compressor of claim 22, wherein said axial direction support means includes:

a fixing plate fixed to an inner portion of the hermetically sealed container for supporting the weight of the same; and an inner side support plate and an outer side support plate engaged with the driving shaft, respectively, with the same slidably contacting with both side surfaces of the fixing plate.

24. The compressor of claim 22, wherein said axial direction support means is disposed toward the second compression chamber and is engaged with the driving shaft.

25. The compressor of claim 17, wherein a plurality of radial direction support means are disposed at the driving shaft at a predetermined interval for radially supporting the driving shaft.

26. The compressor of claim 25, wherein said radial direction support means includes:

a bush bearing contacting with an outer circumferential surface of the driving shaft and inserted on an outer circumferential of the driving shaft;

a bearing housing having an inner diameter having a predetermined difference with an outer diameter of the bush bearing; and a support member fixed to an inner side of the hermetically sealed container and supporting the bearing housing.

27. The compressor of claim 26, wherein said support member supporting the bearing housing is formed of a flexible material capable of absorbing vibration occurring when a driving shaft inserted into the bush bearing is rotated.

28. The compressor of claim 17, wherein the pressure of the first compression chamber into which the gas is introduced is similar with the pressure of the motor chamber, and a portion between the second compression chamber and the motor chamber is hermetically sealed by the axial direction support means.

* * * * *